April 8, 1969  D. J. HURLEY ET AL  3,437,573
PRODUCTION OF ALKYL MONOCHLORIDES
Filed Sept. 1, 1965
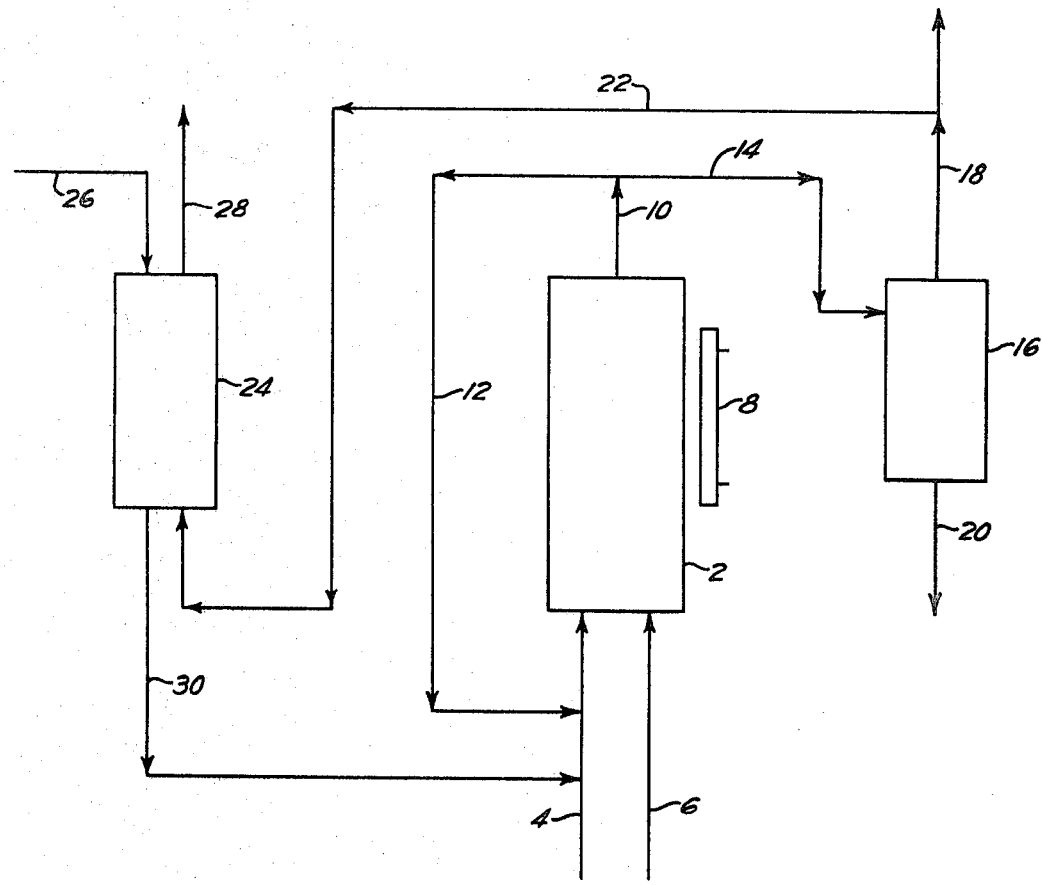
INVENTORS.
DANIEL J. HURLEY
ALFRED N. KRESGE
ROBERT W. ROSENTHAL
ROGER C. WILLIAMSON United States Patent Office 3,437,573
Patented Apr. 8, 1969

3,437,573
PRODUCTION OF ALKYL MONOCHLORIDES
Daniel J. Hurley, Oakmont, Alfred N. Kresge, Verona, Robert W. Rosenthal, Pittsburgh, and Roger C. Williamson, Allison Park, Pa., assignors to Gulf Research & Development Company, Pittsburgh, Pa., a corporation of Delaware
Filed Sept. 1, 1965, Ser. No. 484,344
Int. Cl. C07c *17/10*
U.S. Cl. 204—163                               5 Claims

ABSTRACT OF THE DISCLOSURE

A method for replacing substantially one hydrogen on a paraffin with chlorine to produce monochlorides and for recovering substantially pure HCl.

---

This invention relates to a process for replacing substantially one hydrogen on a paraffin with chlorine and particularly to a process for reacting a normal paraffin with chlorine to obtain essentially a normal alkyl monochloride.

We have found that the above objects can be achieved by a process which comprises passing upwardly through a reactor selected amounts of chlorine and a paraffin hydrocarbon which are initially at about atmospheric temperature and pressure and permitting the resulting reaction mixture freely to rise to its inherent reaction temperature.

The process of this invention can be understood by reference to the drawing which illustrates a preferred embodiment thereof.

Referring to the drawing, a normal paraffin or a mixture of normal paraffins, is passed into the base of reactor 2 by line 4 and chlorine by line 6. The desired reaction between the normal paraffin and chlorine is effected in the presence of a suitable light source. In the event reactor 2 is composed of a transparent material, such as glass, the light means 8 can be mounted externally of reactor 2 but adjacent thereto. If the reactor is totally composed of a material which is not transparent, for example, iron, but lined with glass, the light means can be mounted inside the reactor. In any event, the lower portion of the reactor, for example, the lower fourth thereof, but preferably the lower eighth thereof, is maintained in darkness in order to effect suitable mixing of the normal paraffin and chlorine before the mixture is subjected to the action of the defined light source. Any suitable light source, such as actinic light, can be employed. Such light can be defined as one having a wave length of from about 2000 to about 6000 A, preferably from about 3500 to about 4500 A. Reactor 2 is preferably filled with packing material, such as quartz or glass, preferably glass because of its transparency. The size of the packing is not critical, but is preferably such that the ratio of reactor diameter to packing diameter is at least about 7:1.

The normal paraffin, or mixtures of normal paraffins, that are chlorinated in accordance with the procedure defined herein are liquid normal paraffins having from six to 20 carbon atoms. Such normal paraffins include hexane, heptane, octane, nonane, decane, undecane, dodecane, tridecane, tetradecane, pentadecane, hexadecane, heptadecane, octadecane, nonadecane and eicosane. Also included as normal paraffins that can be chlorinated in accordance with the present procedure are normal paraffins defined above which have one or more of the hydrogens thereof replaced with an element or functional groups which will not be adversely affected under the chlorination conditions defined herein, for example, chlorine, bromine, ketone, nitro, phenyl, carboxylic acid, etc. Examples of such substituted normal paraffins that can be employed are 1-chlorododecane, 2-nitrotetradecane, hexadecanoic acid, 3-bromooctadecane, phenyldecane, 2-nonanone, etc.

The reactants are introduced into the base of reactor 2 under approximately amtospheric pressure and temperature. Any suitable pressure can be maintained within reactor 2, but generally sufficient pressure to facilitate movement of material therethrough is sufficient for example, from about 0 to about five pounds per square inch gauge. As the reactants move upwardly through reactor 2 and come under influence of light means 8 reaction between the chlorine and the normal paraffin takes place. There is no attempt, other than that which escapes normally through the reactor walls, to add or remove heat from the reaction zone. Since the reaction defined herein is exothermic the temperature of the reaction mixture will, of course, rise, but provided the other reaction conditions defined herein are maintained no adverse results will take place and in the reaction of a molecule of the defined normal paraffin with chlorine in all cases substantially only one hydrogen on the normal paraffin will be replaced with a chlorine atom. Since there are so many variables involved, it is difficult to define the temperatures to which the reaction mixture will rise during the course of the reaction, but in general, the temperature will rise to a level of about 50° to about 150° C., preferably about 65° to about 105° C.

In order to replace substantially only one hydrogen on the normal paraffin with an atom of chlorine, it is critical that the total mols of chlorine added per mol of normal paraffin be maintained within a range of about 0.01:1 to about 0.40:1, preferably within a range of about 0.05:1 to about 0.25:1. If the ratio of chlorine to normal paraffin is maintained below the defined level, only a small amount of alkyl chlorides will be obtained, whereas ratios above those defined will lead to undesired polychlorination and the resultant high heat of reaction would tend to accelerate dehydrochlorination reactions.

In order to obtain the desired monochlorination, as defined above, not only must the ratios of chlorine to normal paraffin be carefully controlled, but, additionally, the space velocity (volumne of normal paraffin per volume of free reactor space per hour) must be carefully selected. When the total mol ratio of chlorine used per mol of normal hydrocarbon is low, for example, from about 0.01:1 to about 0.15:1, space velocities over a wide range, for example, from about five to about 2000, can be employed. This is so because the total amount of chlorine brought into contact with the normal paraffin is small and the likelihood of polychlorination is accordingly minimized. However, when such ratios are high a lower space velocity is required, for example, from about 25 to about 124. In such case wherein an ultimate high ratio is to be employed, the reactants are passed upwardly through the reactor, initially using a relatively low ratio of chlorine to normal paraffin. The reaction product obtained, containing unreacted normal paraffin and some chlorinated normal paraffin, is recycled and sent upwardly through the reactor together with the same or different amount of fresh chlorine. This procedure, including recycle, is continued a sufficient number of times so that ultimately the ratio of chlorine to normal paraffin is within the defined higher ratio. During the operation, as noted, no temperature control is involved. Since the amount of chlorine relative to the amount of normal paraffin during each stage of the recycle operation is relatively low, monochlorination is facilitated and yields comparable to those that would theoretically be obtained in batch operation using the same amount of reactants and similar temperatures and pressures are realized.

Recycle, when employed, can be easily effected. Thus, the reaction product is removed overhead from reactor 2 by line 10. The total product or any portion thereof that is to be reacted with additional chlorine, is returned to the base of reactor 2 by line 12, preferably by way of line 4. As before, chlorine is introduced into the reactor by line 6.

It will be observed that the reactants move concurrently upwardly through the reactor. This is desirable for many reasons. Chlorine, being gaseous, will inherently move upwardly through the reactor and will not have a tendency to remain static as it would if it were introduced into the upper part of reactor 2, regardless of whether or not the normal paraffin were moved concurrently downwardly therewith or countercurrently upwardly thereagainst. In addition, concurrent movement, as described above, inherently assures a reaction system wherein progressively as the amount of monochlorinated product is increased the amount of free chlorine available is decreased. This also decreases the possibility of unwanted polychlorination reactions.

The final chlorinated product, which will contain, for example, on a molar basis, about four to about 16 percent of alkyl monochloride, minor amounts, up to about three percent of polychlorinated products, about five to about 25 percent of HCl (formed by reaction of the replaced hydrogen on the normal paraffin with chlorine), about 0.1 to one percent by weight of free chlorine and about 95 to about 79 percent by weight of unreacted normal paraffin, is removed overhead by line 10 and passed by line 14 to separator 16 wherein, for example, at a temperature of about 25° to about 104° C. and a pressure of about 0 to about five pounds per square inch gauge, gaseous HCl and chlorine are removed overhead by line 18 and the mixture of alkyl chlorides and unreacted normal paraffins by line 20. The desired alkyl monochlorides can be separated from the normal paraffins and minor amounts of polychlorinated products in any convenient manner, for example, fractional distillation under reduced pressure.

Since it is desirable in many reactions that pure HCl be available, in a preferred embodiment the gaseous overhead is transferred by line 22 into the base of an absorber 24, preferably containing a packing material similar to that employed in reactor 2. Into the top of reactor 24 there is introduced by line 26 a normal paraffin that is to be chlorinated in reactor 2 according to the dictates of this invention. The flow of normal paraffin downwardly through absorber 24 and of the gases HCl and chlorine upwardly through absorber 24 are so adjusted that there is essentially complete reaction of all the chlorine therein with the normal paraffin. Thus, the normal paraffin can be moved through absorber 24 using a space velocity (volume of normal paraffin per volume of absorber per hour) of about five to about 2000, while the gaseous HCl and chlorine can be moved therethrough at a space velocity (volume of combined gases per volume of absorber per hour) of about 2.5 to about 5000. As in reactor 2, no attempt is made to control the temperatures and pressures therein. While atmospheric temperatures and pressures are preferred, a temperature of about 25° to about 50° C. and a pressure of about 0 to about five pounds per square inch, can be employed if desired.

Gaseous HCl, essentially free of chlorine, is removed overhead from absorber 24 by line 28. Partially chlorinated normal paraffin is removed from the base of absorber 24 by line 30 and passed to line 4. In this case the partially chlorinated normal paraffin product will constitute the charge initially introduced into the base of reactor 2.

The process defined herein can further be illustrated by reference to the following chlorination studies wherein a chlorination reactor made of glass of a length of 36 inches and an internal diameter of one inch was employed. The reactor was packed with glass beads having an average diameter of three millimeters and the lower 14 inches thereof was wrapped with a black tape to form a darkened mixing pre-reaction zone. The hydrocarbon and the chlorine were both introduced at the base of the reaction zone with the hydrocarbon entrance being an inch below the chlorine entrance. Thermocouples were inserted in the packing so that a temperature profile of the entire tube could be obtained. Three ordinary 150-watt G.E. flood lamps were placed within several inches of the tube and fully illuminated the top 22 inches of the reaction zone. The normal paraffin employed as charge was a dodecane fraction of 96-98 percent purity, with the impurities being equally divided between isoparaffins of the same carbon number and cycloalkanes.

Prior to chlorination the reactor was filled with hydrocarbon, the lights were turned on, the hydrocarbon was blown through with nitrogen for 15 minutes and then chlorine was introduced into the reactor through a flowmeter at atmospheric pressure and ambient temperature. Once the reaction had begun, as evidenced by an exotherm and by the disappearance of the characteristic green color, the hydrocarbon flow was begun (measured by a flow meter) and the reaction was permitted to attain steady state conditions as evidenced by a constant temperature profile. The reaction mixture, throughout the course of the runs, was freely permitted to rise to its inherent reaction temperature. After a steady state had been achieved samples were taken, which were then washed with water several times, dried over magnesium sulfate and finally analyzed for bound chlorine and product distribution by gas-liquid chromatography. The monochloride yield was compared with the theoretical amount that would have been obtained had the same molar ratios of chlorine and hydrocarbon been reacted in a batch reactor. Results of over 100 percent obtained are due to the limitation of accuracy of analysis.

The reaction mixture was permitted to flow out of an overflow exit near the top of the reaction zone into a separator wherein the gas was removed overhead and the liquid product was withdrawn from the bottom. When high flow rates or high ratios of chlorine to normal paraffin were employed the preferred method involved a recycle of the entire reaction product. In such cases, a recycle at low ratios of chlorine to normal paraffin was employed, and the entire product was recharged into the bottom of the reactor where it came into contact with fresh chlorine. The results are tabulated below in Table I. The gram atoms of chlorine per mol of normal paraffin relates to the total amount of bound chlorine found relative to the normal paraffin charged.

TABLE I

| Run No. | Type of operation | LHSV (volume of hydrocarbon per volume of free reactor per hour) | Temperature range throughout reactor, °C. | Ratio of gram atom of chlorine per mol of paraffin | Monochloride yield, percent of theory for batch reactor |
|---|---|---|---|---|---|
| 1 | Single pass | 124 | 36-96 | 0.20:1 | 90.5 |
| 2 | do | 62 | 34-104 | 0.21:1 | 87.5 |
| 3 | do | 31 | 32-104 | 0.20:1 | 103 |
| 4 | do | 31 | 32-104 | 0.22:1 | 105 |
| 5 | do | 26 | 110-150 | 0.42:1 | 77.5 |
| 6 | Initial pass | 124 | 34-66 | 0.06:1 | 99.4 |
|   | Recycle | 124 | 34-66 | 0.13:1 | |
|   | do | 124 | 34-66 | 0.20:1 | 102 |
|   | do | 124 | 34-66 | 0.23:1 | 99.1 |
| 7 | Initial pass | 62 | 29-77 | 0.06:1 | |
|   | Recycle | 62 | 29-77 | 0.22:1 | 103 |
|   | do | 62 | 29-77 | 0.33:1 | 102 |
| 8 | Single pass | 26 | ¹44-83 | 0.40:1 | 85.0 |

¹ Denotes water cooled.

A study of the data Runs Nos. 1 to 4 in Table I reveals that when a gram atom ratio of chlorine to normal paraffin of about 0.20:1 is employed good results yielding quantitative amounts of alkyl chlorides are obtained at lower space velocities. However, Run No. 5 shows that even at relatively low space velocities both poorer yields and higher temperatures are obtained when the defined ratio is in excess of about 4.40:1. Runs Nos. 6 and 7 show that the operation can be carried out at either the higher or lower space velocities with relatively low temperatures when recycle operations are employed. Run No. 8 showed that with single pass operation at high chlorine to paraffin ratio even low temperatures could not effect good monochloride yields.

The alkyl chlorides obtained herein can be used to alkylate benzene, and the alkylbenzene so produced, having from 11 to 44 carbon atoms, can be reacted with a sulfonating agent, such as sulfuric acid, oleum or sulfur trioxide, and then neutralized to form alkyl benzene sulfonate detergents. The remaining alkyl benzenes so produced can be employed as wetting agents or oil-soluble detergents.

Obviously, many modifications and variations of the invention as hereinabove set forth, can be made without departing from the spirit and scope thereof, and therefore only such limitations should be imposed as are indicated in the appended claims.

We claim:

1. A process for replacing substantially only one hydrogen on a liquid normal paraffin with chlorine which comprises passing upwardly through a reactor chlorine and a normal paraffin at a hydrocarbon space velocity of about five to about 2000 in the presence of actinic light, the ratio of the mols of chlorine employed per mol of normal paraffin being from about 0.01:1 to about 0.4:1, wherein said chlorine and said normal paraffin are initially at about atmospheric temperature and pressure, permitting the reaction mixture freely to rise to its inherent reaction temperature, separating gaseous HCl formed during the reaction and unreacted chlorine from the reaction mixture, moving said gaseous HCl and unreacted chlorine upwardly through an absorption zone, passing a normal paraffin downwardly through said absorption zone, removing gaseous HCl from the top of said absorption zone and partially chlorinated normal paraffin from the base thereof and employing said latter normal paraffin to constitute the normal paraffin charge to said reactor.

2. A process for replacing substantially only one hydrogen on a liquid normal paraffin with chlorine which comprises passing upwardly through a reactor chlorine and a normal paraffin at a hydrocarbon space velocity of about five to about 2000 in the presence of actinic light, the ratio of the mols of chlorine employed per mol of normal paraffin being from about 0.05:1 to about 0.25:1, wherein said chlorine and said normal paraffin are initially at about atmospheric temperature and pressure, permitting the reaction mixture freely to rise to its inherent reaction temperature, separating gaseous HCl formed during the reaction and unreacted chlorine from the reaction mixture, moving said gaseous HCl and unreacted chlorine upwardly through an absorption zone, passing a normal paraffin downwardly through said absorption zone, removing gaseous HCl from the top of said absorption zone and partially chlorinated normal paraffin from the base thereof and employing said latter normal paraffin to constitute the normal paraffin charge to said reactor.

3. A process for replacing substantially only one hydrogen on a liquid normal paraffin with chlorine which comprises passing upwardly through a reactor chlorine and a normal paraffin at a hydrocarbon space velocity of about five to about 2000 in the presence of actinic light, wherein said chlorine and said normal paraffin are initially at about atmospheric pressure, permitting the reaction mixture freely to rise to its inherent reaction temperature, removing reaction product from the reaction zone adjacent the top thereof, recycling said reaction product to the base of said reaction zone together with additional chlorine, continuing the recycling operation until the ratio of the mols of chlorine employed per mol of said normal paraffin is within a range of about 0.01:1 to about 0.4:1, separating gaseous HCl formed during the reaction and unreacted chlorine from the reaction mixture, moving said gaseous HCl and unreacted chlorine upwardly through an absorption zone, passing a normal paraffin downwardly through said absorption zone, removing gaseous HCl from the top of said absorption zone and partially chlorinated normal paraffin from the base thereof and employing said latter normal paraffin to constitute the normal paraffin charge to said reactor.

4. A process for replacing substantially only one hydrogen on a liquid normal paraffin with chlorine which comprises passing upwardly through a reactor chlorine and a normal paraffin at a hydrocarbon space velocity of about five to about 2000 in the presence of actinic light, wherein said chlorine and said normal paraffin are initially at about atmospheric pressure, permitting the reaction mixture freely to rise to its inherent reaction temperature, removing reaction product from the reaction zone adjacent the top thereof, recycling said reaction product to the base of said reaction zone together with additional chlorine, continuing the recycling operation until the ratio of the mols of chlorine employed per mol of said normal paraffin is within a range of about 0.05:1 to about 0.25:1, separating gaseous HCl formed during the reaction and unreacted chlorine from the reaction mixture, moving said gaseous HCl and unreacted chlorine upwardly through an absorption zone, passing a normal paraffin downwardly through said absorption zone, removing gaseous HCl from the top of said absorption zone and partially chlorinated normal paraffin from the base thereof and employing said latter normal paraffin to constitute the normal paraffin charge to said reactor.

5. A process for replacing substantially only one hydrogen on a liquid normal paraffin with chlorine which comprises passing upwardly through a reactor chlorine and a normal paraffin at a hydrocarbon space velocity of about five to about 2000 in the presence of actinic light, wherein said chlorine and said normal paraffin are initially at about atmospheric pressure, permitting the reaction mixture to rise to a temperature of about 50° to about 150° C., removing reaction product from the reaction zone adjacent the top thereof, recycling said reaction product to the base of said reaction zone together with additional chlorine, continuing the recycling operation until the ratio of the mols of chlorine employed per mol of said normal paraffin is within a range of about 0.05:1 to about 0.25:1, separating gaseous HCl formed during the reaction and unreacted chlorine from the reaction mixture, moving said gaseous HCl and unreacted chlorine upwardly through an absorption zone, passing a normal paraffin downwardly through said absorption zone, removing gaseous HCl from the top of said absorption zone and partially chlorinated normal paraffin from the base thereof and employing said latter normal paraffin to constitute the normal paraffin charge to said reactor.

References Cited

UNITED STATES PATENTS

| | | | |
|---|---|---|---|
| 2,683,688 | 7/1954 | Tramm et al. | 204—163 |
| 2,948,667 | 8/1960 | Limido et al. | 204—163 |
| 3,099,612 | 7/1963 | Wilson | 204—158 |
| 3,296,108 | 1/1967 | Hutson et al. | 204—163 |

HOWARD S. WILLIAMS, *Primary Examiner*.